United States Patent
Walker (10) Patent No.: US 9,830,713 B1
(45) Date of Patent: Nov. 28, 2017

(54) SURVEILLANCE IMAGING SYSTEM AND METHOD

(71) Applicant: Rockwell Collins, Inc., Cedar Rapids, IA (US)

(72) Inventor: Brad A. Walker, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 47 days.

(21) Appl. No.: 14/972,479

(22) Filed: Dec. 17, 2015

(51) Int. Cl.
| | |
|---|---|
| *G06K 9/00* | (2006.01) |
| *G06T 7/20* | (2017.01) |
| *B64C 39/02* | (2006.01) |
| *H04N 5/247* | (2006.01) |
| *G06T 7/00* | (2017.01) |

(52) U.S. Cl.
CPC .......... *G06T 7/2093* (2013.01); *B64C 39/024* (2013.01); *G06T 7/004* (2013.01); *H04N 5/247* (2013.01); *B64C 2201/024* (2013.01); *B64C 2201/123* (2013.01); *B64C 2201/141* (2013.01); *G06T 2207/10016* (2013.01); *G06T 2207/10032* (2013.01); *G06T 2207/20092* (2013.01); *G06T 2207/30241* (2013.01)

(58) Field of Classification Search
CPC combination set(s) only.
See application file for complete search history.

(56) References Cited

U.S. PATENT DOCUMENTS

2014/0163772 A1*  6/2014  Vian .................... G05D 1/0094
                                                                   701/2
2015/0278640 A1* 10/2015  Johnson ............. G06K 9/00657
                                                                    382/110

\* cited by examiner

*Primary Examiner* — Alex Liew
(74) *Attorney, Agent, or Firm* — Angel N. Gerdzhikov; Donna P. Suchy; Daniel M. Barbieri (57) ABSTRACT

A system and related method for detecting unmanned aerial vehicles and other targets aboard an aircraft scans a region proximal to the aircraft with a network of image sensors attached to the aircraft exterior. Visual processors detect potential targets and determine location data associated with the targets based on the captured images, sending the captured images and associated location data to a visual display system for display to a pilot or crew of the aircraft along with cueing symbology. The visual display system may include a cockpit-mounted heads-down display, a monocular, binocular, or head-tracking helmet-mounted display, or an offboard mobile device. The system may scan a 3-D space around the aircraft or a proximal 2-D section of terrain.

19 Claims, 7 Drawing Sheets

SURVEILLANCE IMAGING SYSTEM AND METHOD

BACKGROUND

Unmanned aerial vehicles (UAV) such as drones or multirotor vehicles (e.g., quadcopters, hexacopters, octocopters and the like) pose a significant threat to military and commercial aircraft alike. For example, most consumer grade UAVs do not carry transponders and are therefore undetectable by secondary surveillance radar (SSR) or automatic dependent surveillance-broadcast (ADS-B) systems. A pilot may generally detect a UAV proximal to the aircraft only via unaided visual recognition, which may be difficult even under the best of visibility or atmospheric conditions due to the small size of the UAV. Even if a pilot is able to visually detect a threatening UAV (one proximal to, on a collision course with, or otherwise capable of damaging the aircraft), eliminating the threat may only be as effective a tactic as the pilot's ability to guess at the exact position of the UAV.

SUMMARY

In one aspect, embodiments of the inventive concepts disclosed herein are directed to an aircraft-based system for detecting and targeting unmanned aerial vehicles (UAV) and similar airborne targets, and sending the coordinates of those targets to an onboard or offboard visual display system. The system may employ a network of image sensors arranged over the exterior of the aircraft to capture a series of images by scanning a region proximal to the aircraft, employing visual and pattern recognition to detect potential targets based on the captured images. The system may display the captured images to the pilot for visual validation or active selection of a potential target.

Once a target has been detected, the system determines the coordinates of the target and sends the captured images and coordinates to a visual display system, which may display images of the target and other pertinent information to the pilot via a cockpit-mounted display or a helmet-mounted display. The system may include a second UAV equipped with one or more cameras and configured to scan a section of terrain underneath the UAV to detect persons or other moving targets, determine the locations of those targets, and display the captured imagery and location data via an offboard mobile device carried by a soldier or law enforcement professional in pursuit of the moving target.

In a first aspect, the system may include a network of image sensors attached to the exterior of the aircraft and configured to capture a series of images by scanning a region around the aircraft. The system may include visual processors configured to determine the dimensions of the scanned region and detect a target object within the region based on the captured images. The visual processors may generate location data associated with the target object based on the captured images and forward the captured images and location data to a visual display system. The visual display system may display the captured images and location data.

In a further aspect, the inventive concepts disclosed herein are directed to a system wherein the visual processors are configured to display the captured images and select a target object based on input provided by a pilot via the visual display system.

In a further aspect, the inventive concepts disclosed herein are directed to a system wherein the visual processors determine a distance, inertial coordinates, or georeferenced coordinates of the target object based on the captured images.

In a further aspect, the inventive concepts disclosed herein are directed to a system wherein the visual processors determine a velocity, a heading, or a future position of the target object based on the captured images.

In a further aspect, the inventive concepts disclosed herein are directed to a system wherein the scanned region includes a three-dimensional space and a two-dimensional section of terrain.

In a further aspect, the inventive concepts disclosed herein are directed to a system wherein the target object includes an unmanned aerial vehicle (UAV).

In a further aspect, the inventive concepts disclosed herein are directed to a system wherein the image sensors include visible light image sensors, infrared image sensors, ultraviolet image sensors, and stereo paired image sensors.

In a further aspect, the inventive concepts disclosed herein are directed to a system wherein the image sensors include at least a first image sensor at a first location on the exterior surface of the aircraft and a second image sensor at a second location on the exterior surface of the aircraft.

In a further aspect, the inventive concepts disclosed herein are directed to a system wherein the visual processors are incorporated into one or more of the plurality of image sensors.

In a further aspect, the inventive concepts disclosed herein are directed to a system wherein the visual display system includes a heads-down display (HDD), a helmet-mounted display (HMD), a multispectral fusion display system, a head-tracking display system, and an offboard mobile device.

In a further aspect, the inventive concepts disclosed herein are directed to a system wherein the visual display system is configured for picture-in-picture display, digital zoom of the captured images, or the display of symbology associated with the captured images, the location data, or the target object.

In a further aspect, the inventive concepts disclosed herein are directed to a system wherein the displayed symbology includes a threat assessment, a mapping detail, an identifier of the target object, and a route to a location of a target object.

In a still further aspect, the inventive concepts disclosed herein are directed to a method for detecting a target object via an aircraft-based system. The method may include detecting the target object by scanning a region proximal to the aircraft via a network of image sensors attached to the aircraft exterior, the image sensors configured to capture a series of images associated with the target object. The method may include determining location data associated with the target object based on the captured images via visual processors. The method may include displaying the captured images and location data via a visual display system.

In a further aspect, the inventive concepts disclosed herein are directed to a method further including displaying the captured images to a user via the visual display system and selecting the target object based on input from the user through the visual display system.

In a further aspect, the inventive concepts disclosed herein are directed to a method further including detecting the target object by scanning a section of terrain proximal to the aircraft.

In a further aspect, the inventive concepts disclosed herein are directed to a method further including determining a distance, inertial coordinates, georeferenced coordinates, a velocity, a heading, and a future position of the target object based on the captured images.

In a further aspect, the inventive concepts disclosed herein are directed to a method further including displaying the captured images and associated location data via a heads-down display (HDD), a helmet-mounted display (HMD), and an offboard mobile device.

In a further aspect, the inventive concepts disclosed herein are directed to a method further including displaying the captured images and location data via a head-tracking HMD.

In a further aspect, the inventive concepts disclosed herein are directed to a method further including displaying symbology associated with the captured images, the location data, or the target object via the visual display system. The symbology may include a threat assessment, a mapping detail, an identifier of the target object, and a route to a location of the target object.

BRIEF DESCRIPTION OF THE DRAWINGS

The inventive concepts disclosed herein may be better understood by those skilled in the art by reference to the accompanying figures in which.

DETAILED DESCRIPTION

Features of the inventive concepts disclosed herein in their various embodiments are exemplified by the following descriptions with reference to the accompanying drawings, which describe the inventive concepts with further detail. It is to be understood that both the foregoing general description and the following detailed description are exemplary and explanatory only and are not necessarily restrictive of the inventive concepts disclosed and claimed herein. These drawings depict only exemplary embodiments of the inventive concepts, and should not be considered to limit their scope in any way.

Embodiments of the inventive concepts disclosed herein are directed to a system and related method for detecting airborne targets via a network of image sensors aboard an aircraft and determining the location of detected targets based on captured images. The captured images and location data are displayed aboard the aircraft by a visual display system, or to a remote user via an offboard mobile device.

Figure 1:
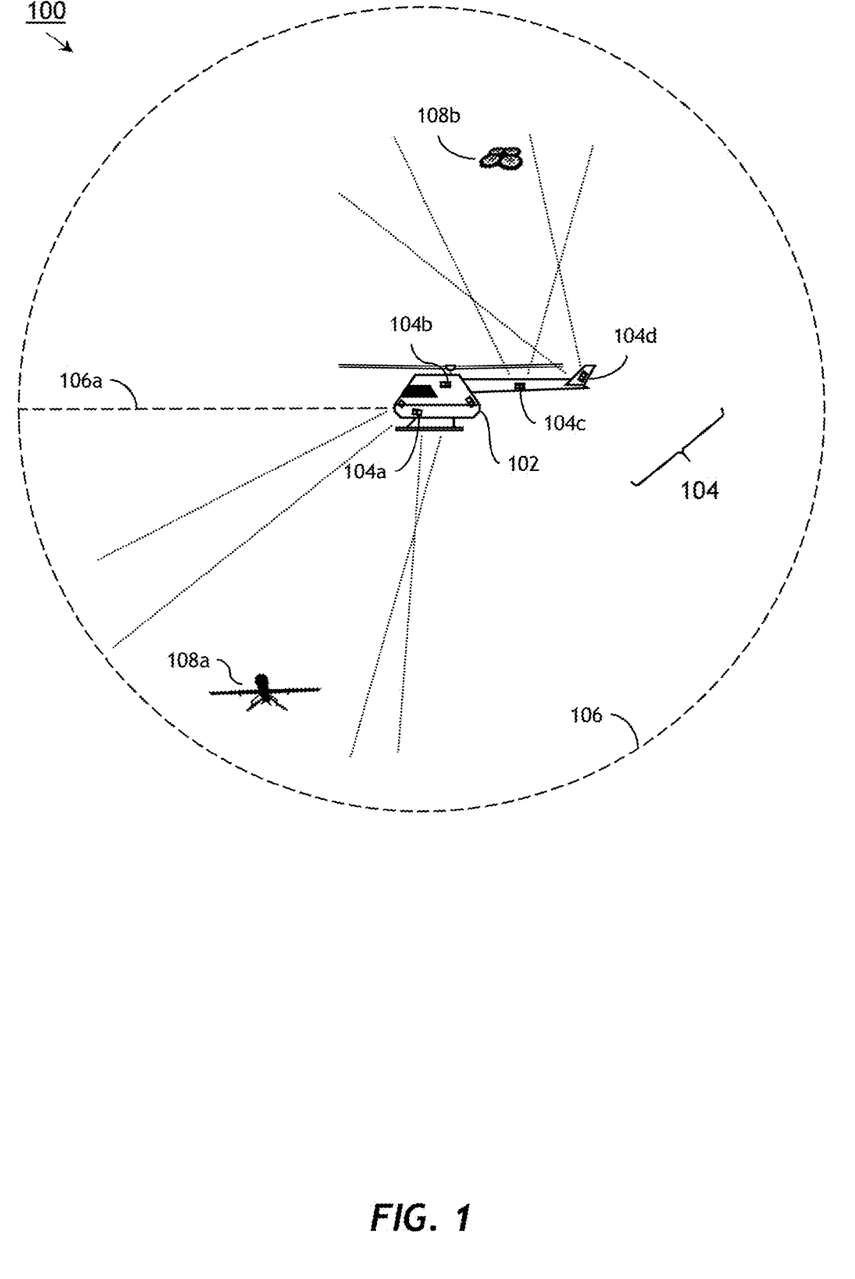
FIG. 1 is a diagrammatic illustration of a system according to embodiments of the inventive concepts disclosed herein.

Referring to FIG. 1, a system 100 for target detection aboard an aircraft according to embodiments of the inventive concepts disclosed herein is shown. An aircraft 102 may be equipped with a network of image sensors 104a-f attached to, or positioned on, the exterior of the aircraft 102. The network of image sensors 1-4a-f may include any desired number of sensors 104 which are collectively configured to capture an image or stream of images associated with any point in line of sight within a scanning region 106 surrounding the aircraft 102. The scanning region 106 may include a spherical region defined by a predetermined radius 106a, the radius 106a set by a control system of the aircraft 102, or any appropriate three-dimensional region proximal to the aircraft 102. The network of image sensors 104a-f may identify potential targets 108a-b within the scanning region 106 based on captured images including the potential targets 108a-b. For example, the potential target 108a may lie within the scanning region 106 and within the fields of vision of individual image sensors 104a and 104b. Similarly, the potential target 108b may lie within the field of vision of image sensors 104c and 104d.

Figure 2A:
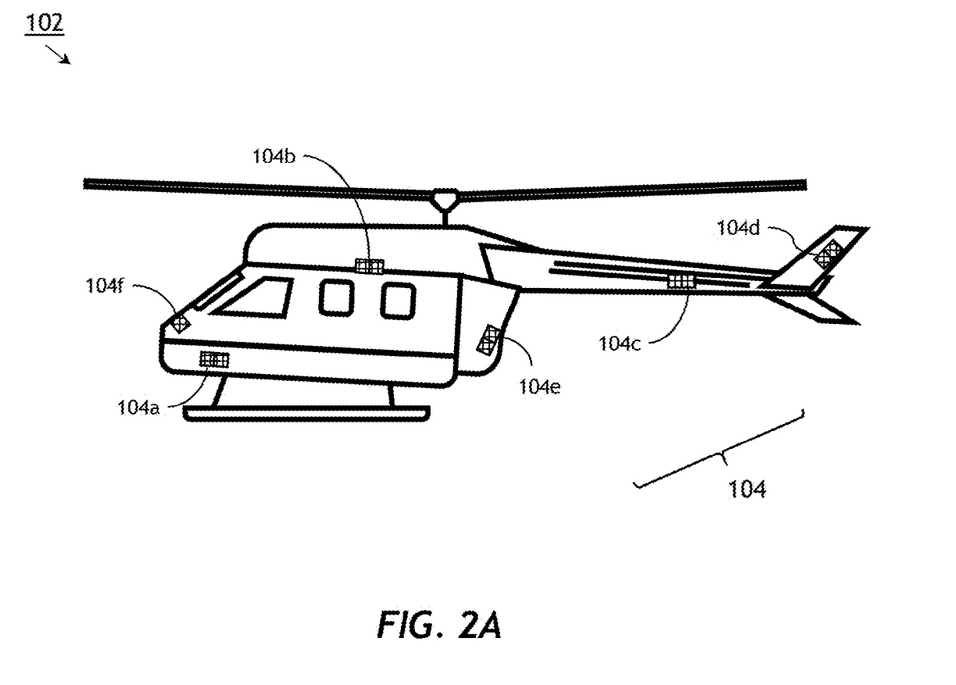
FIG. 2A is an illustration of an aircraft according to embodiments of the inventive concepts disclosed herein.
Figure 2B:
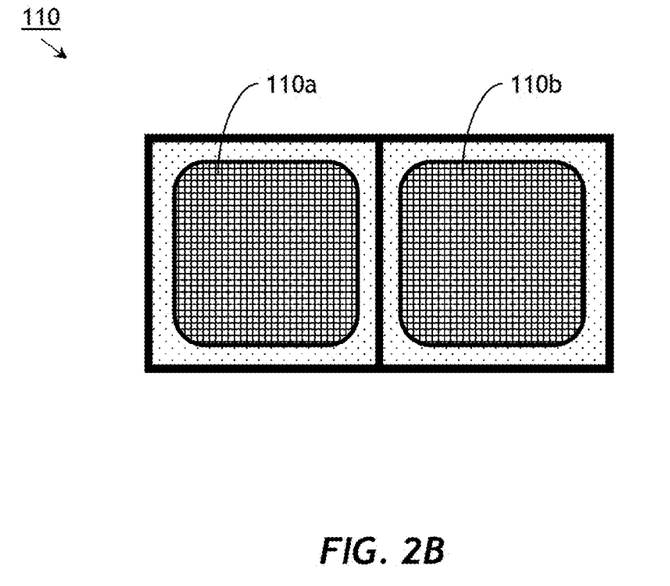
FIG. 2B is an illustration of an image sensor according to embodiments of the inventive concepts disclosed herein.

Referring to FIG. 2A, the aircraft 102 may be implemented as a helicopter or other rotary aircraft, a fixed-wing aircraft, or an unmanned aerial vehicle (UAV). The network of image sensors 104a-f may include single visible light sensors, infrared light sensors, and image sensors with integrated visual processors. The network of image sensors 104a-f may be arranged about the exterior of the aircraft 102 such that every point within the scanning region 106 (FIG. 1) surrounding the aircraft 102 remains in line of sight of at least one image sensor 104a-f, and optimally two or more image sensors 104a-f. For example, the network of image sensors 104a-f may include an image sensor 104a in a port forward position on the exterior of the aircraft 102; an image sensor 104b in a port midship position; an image sensor 104c in a port boom position; an image sensor 104d in a port tail position; an image sensor 104e in a port aft position; and a forward-mounted image sensor 104f. The starboard side (not shown) of the aircraft 102 may include a complementary arrangement of image sensors 104a-f; the precise placement of image sensors 104a-f may vary with the configuration of the aircraft 102. Referring also to FIG. 2B, the network of image sensors 104a-f may include a stereo paired image sensor 110 including two image sensors 110a, 110b configured to capture images from minimally differing perspectives (e.g., situated at a relatively small distance from each other compared to the image sensors 104a, 104d situated at opposite ends of the aircraft 102) that may be combined to simulate a stereoptic perspective.

Figure 3:
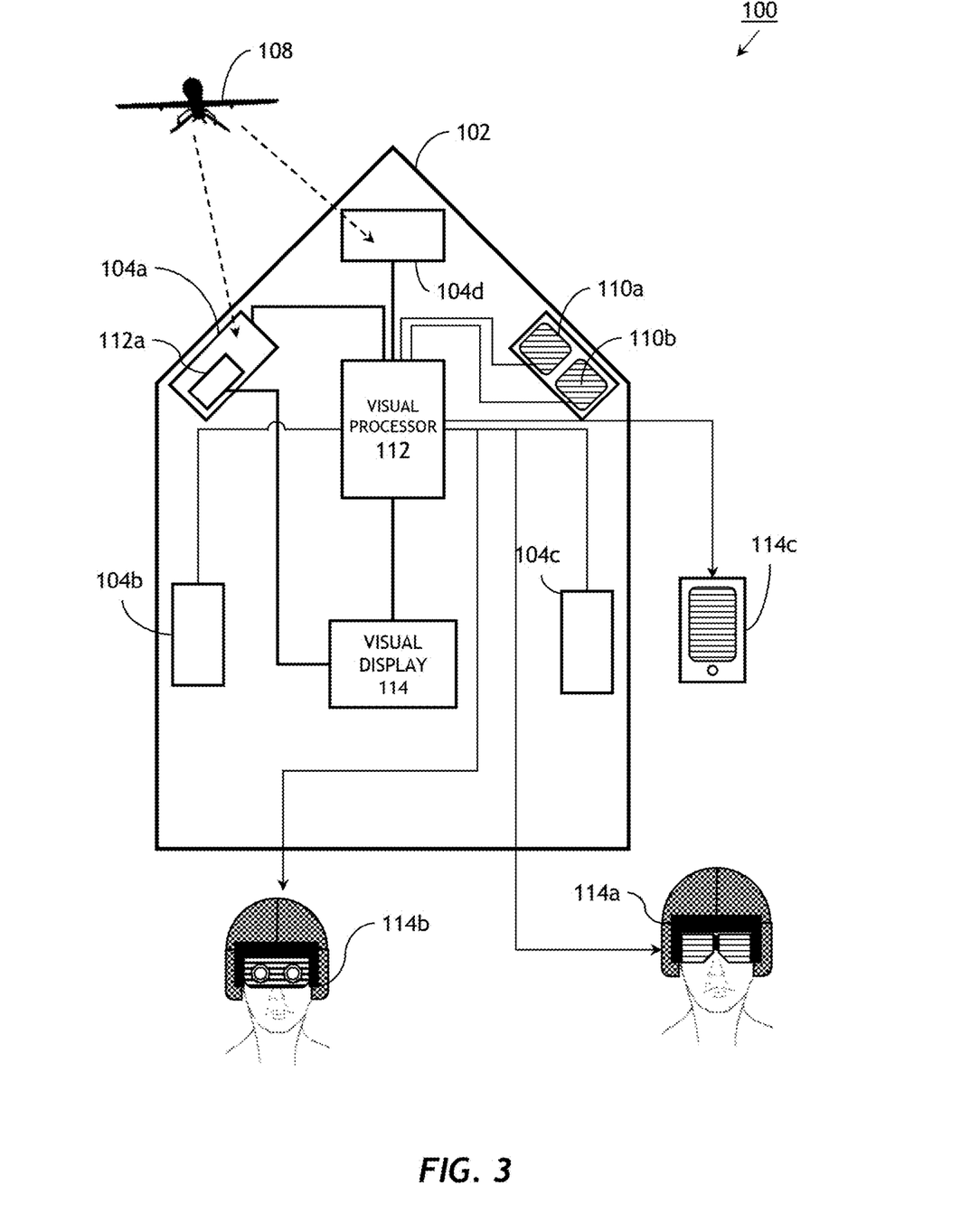
FIG. 3 is a block diagram of a system according to embodiments of the inventive concepts disclosed herein.

Referring to FIG. 3, a block diagram of the system 100 of FIG. 1 is shown. The network of image sensors 104a-e (which may include stereo-paired image sensors 110a and 110b) may be distributed throughout the exterior of the aircraft 102. When a target 108 (including a potential target) comes within the line of sight of one or more image sensors 104a-f, visual processors 112 onboard the aircraft 102 may determine whether the target 108 constitutes a legitimate target and, if so, determine location data associated with the target 108 based on the images captured by the image sensors 104a-f. The visual processors 112 may include or incorporate existing aircraft processing systems, or visual processing may be performed by integrated visual processors 112a incorporated into an image sensor 104a, which then forwards determined location data and the captured images to a visual display system 114 of the aircraft 102. Visual processors 112 may employ pattern recognition algorithms and other strategies to determine whether a target 108 presents a shape, a heading, a size, a thermal signature, or other characteristics associated with a valid or confirmed target. The visual processors 112 may forward captured images to the visual display system 114 for display to a pilot or crewmember of the aircraft 102, determining whether the target 108 is a valid target based on the pilot's visual evaluation and validation of the target.

When the system 100 identifies a target 108 based on images captured by the image sensors 104*a-f*, and the target 108 is confirmed as a valid target (e.g., an unmanned aerial vehicle or similar hostile object), the visual processors 112 may determine location data associated with the target 108. For example, the visual processors may determine a distance of the aircraft 102 to the potential target 108 and positional (e.g., Cartesian, inertial) coordinates corresponding to the location of the potential target 108 based on epipolar geometry. The visual processors 112 may determine absolute or georeferenced coordinates (e.g., GPS coordinates) of the target 108 based on the captured images, the determined distance, and the determined positional coordinates of the target 108. The visual processors 112 may employ Kalman filtering, optical flow analysis, or similar strategies to infer a future state of the target 108. For example, the visual processors 112 may infer a future position, a velocity, a rate of acceleration, or a heading of the target 108.

Images associated with the target 108 (and captured by the image sensors 104*a,d*) may be forwarded along with determined location data associated with the target 108 to the visual display system 114 for display to the pilot or crew of the aircraft 102. The visual display system 114 may include a cockpit-mounted heads-down display (HDD) or a (binocular or monocular) helmet-mounted display 114*a* (HMD) worn by the pilot or crewmember. The visual display system 114 may include additional features for enhancement of visual intelligence, such as picture-in-picture display or digital zoom capability. The HMD 114*a* may include a night-vision HMD 114*b* configured for use in darkness, adverse weather, or other types of degraded visual environment (DVE). Targeting imagery associated with a three-dimensional scanning region (106, FIG. 1) may be presented to the pilot by the visual display system 114 in a format providing for depth perception. For example, if the pilot is not equipped with an HMD 114*a*, the pilot's helmet visor may be equipped with polarizing filters configured to provide depth perception in conjunction with a HDD of the visual display system 114. A visual display system 114 including an HMD 114*a* may employ head-tracking to present visual information and location data associated with a target 108 spherically. For example, the HMD 114*a* may display captured images associated with the target 108 if the pilot wearing the HMD 114*a* is looking in the appropriate direction, regardless of whether the pilot has a clear visual line of sight to the target 108 (e.g., "see-through helicopter"), and shift the displayed imagery based on the pilot's head movements. The visual display system 114 may further include an offboard mobile device 114*c* such as a tablet, smartphone, or other portable computing device.

Figure 4:
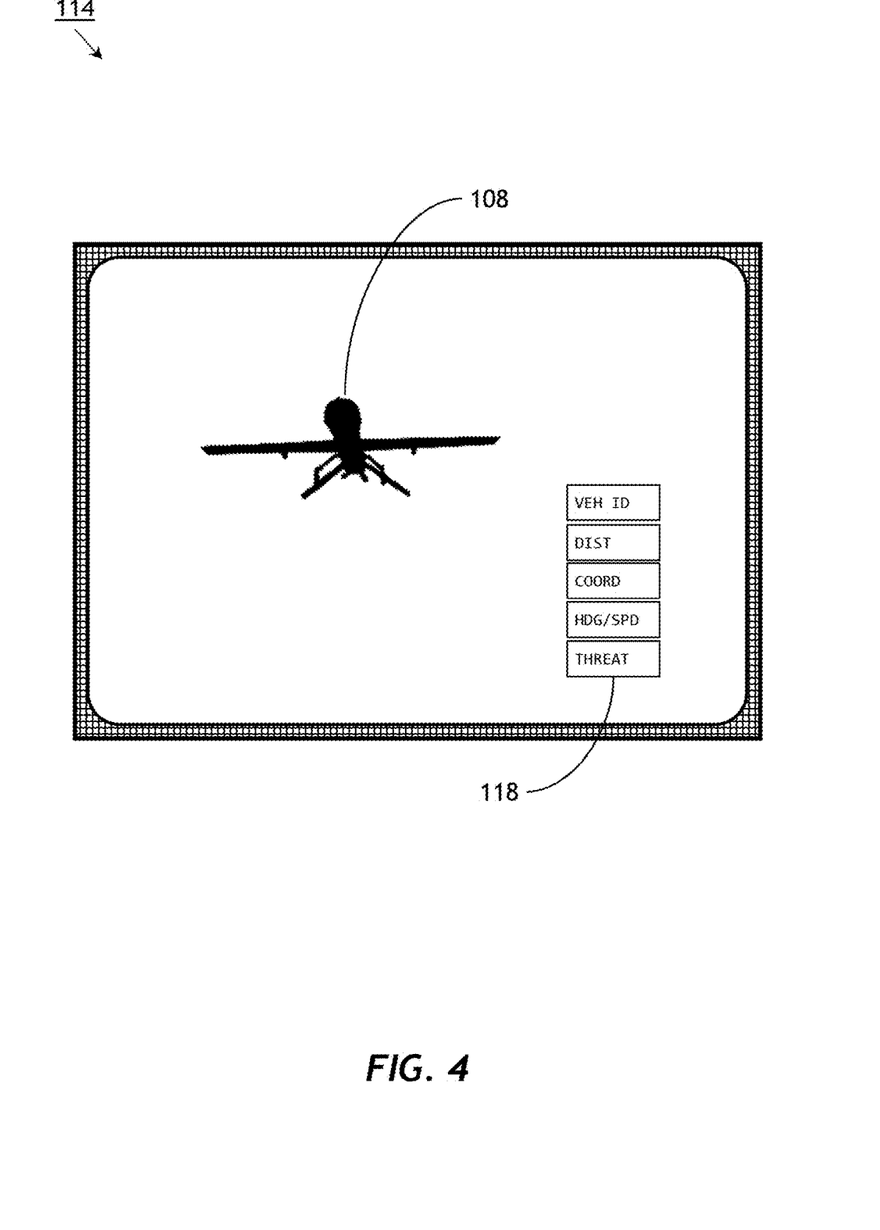
FIG. 4 is a diagrammatic illustration of a visual display system according to embodiments of the inventive concepts disclosed herein.

Referring to FIG. 4, a simulation of the visual information and location data displayed by the visual display system 114 is shown. The visual display system 114 may display captured images associated with a target 108 (e.g., via HDD, via HMD, via mobile device) as well as location data determined by the visual processors (not shown) and presented to the pilot or crew in the form of cues or symbology 118. For example, symbology 118 displayed by the visual display system 114 may include a distance, coordinates, heading, velocity, thermal signature, identifier, or threat assessment of the target 108. The visual display system 114 may include a multispectral fusion display system capable of simultaneously displaying visual intelligence associated with the target 108 as well as thermal intelligence associated with the target 108 and captured by infrared or other thermal imaging sensors of the system 100. Symbology 118 may include visual enhancements or mapping details of the environment surrounding the target 118 such as an artificial horizon.

Figure 5A:
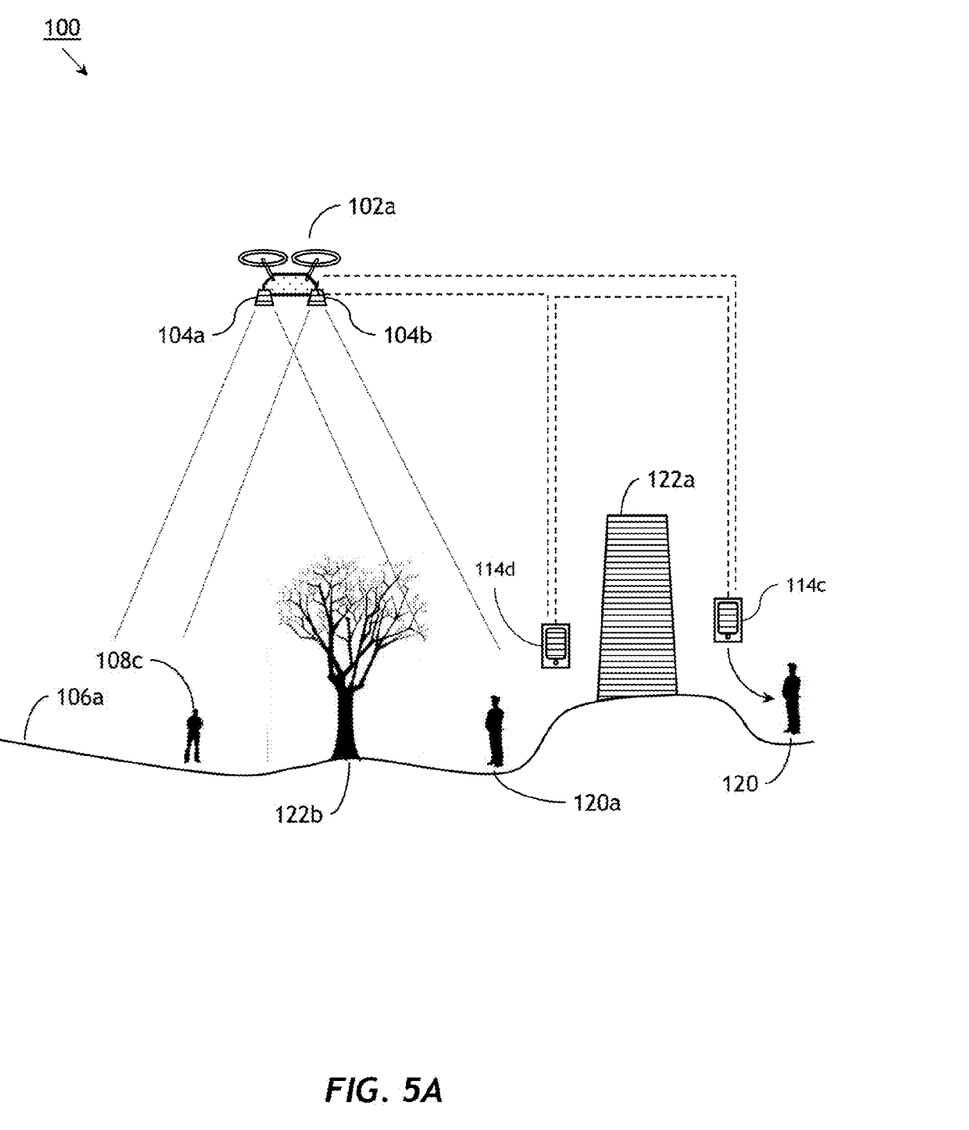
FIG. 5A is a diagrammatic illustration of a system according to embodiments of the inventive concepts disclosed herein.
Figure 5B:
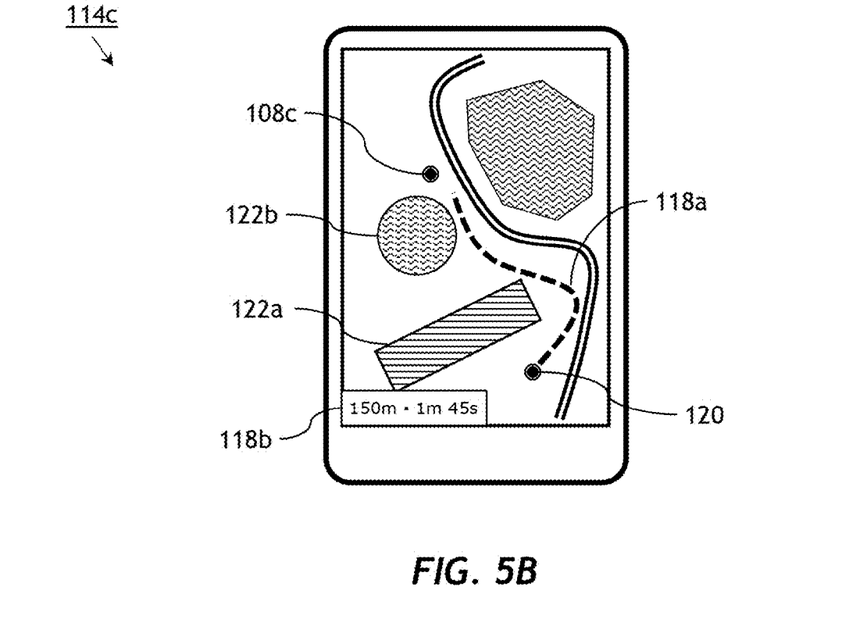
FIGS. 5B and 5C are illustrations of a visual display system according to embodiments of the inventive concepts disclosed herein.

Referring to FIGS. 5A and 5B, in some embodiments of the inventive concepts disclosed herein, the aircraft may be an unmanned aerial vehicle 102*a*, the scanning region may include a two-dimensional section of terrain 106*a* proximal to the UAV 102*a*, and the target may include a target individual 108*c* being pursued by a soldier, law enforcement professional, or other similar user 120 of the system 100. For example, the user 120 may carry a mobile device 114*c* configured as a visual display unit of the system 100. The user 120 may not have a clear line of sight to the target individual 108*c* due to the presence of obstacles 122, or his/her knowledge of the surrounding terrain 106*a* may be limited by unfamiliarity with the terrain or by DVE conditions. The UAV 102*a* may be equipped with one or more image sensors 104*a-b* (including visible-light, ultraviolet, or thermal imaging sensors) configured to scan the section of terrain 106*a* designated by the system 100 and capture images of the section of terrain 106*a* to evaluate any objects within the field of vision of the image sensors 104*a-b*.

Visual processing of the captured images may be performed by visual processors of the system 100 (not shown) aboard the UAV 102*a*, or the captured images may be streamed to the mobile device 114*c* carried by the user for evaluation and display. For example, the system 100 may identify the target individual 108*c* within the section of terrain 106*a* based on shape, movement, or thermal signature and determine the coordinates of the target individual 108*c*.

Referring particularly to FIG. 5B, the mobile device 114*c* may display images associated with the target individual 108*c* along with determined location data in the form of symbology 118. For example, having identified the location (e.g., georeferenced coordinates) of the target individual 108*c*, the mobile device 114*c* may determine the coordinates of the user 120 based on an onboard GPS receiver or position sensor and display imagery associated with the section of terrain 106*a* along with the relative locations of the user 120 and target individual 108*c*, showing any terrain characteristics (such as obstacles 122*a-b*) identified by visual processing or location-based metadata (e.g., by cross-referencing images and location data with existing terrain databases). The mobile device 114*c* may further display symbology corresponding to a recommended route 118*a* to the target individual 108*c* (based on available mapping and terrain information) and a projected distance and time to intercept (118*b*) the target individual 108*c* based on the recommended route 118*a*.

Figure 5C:
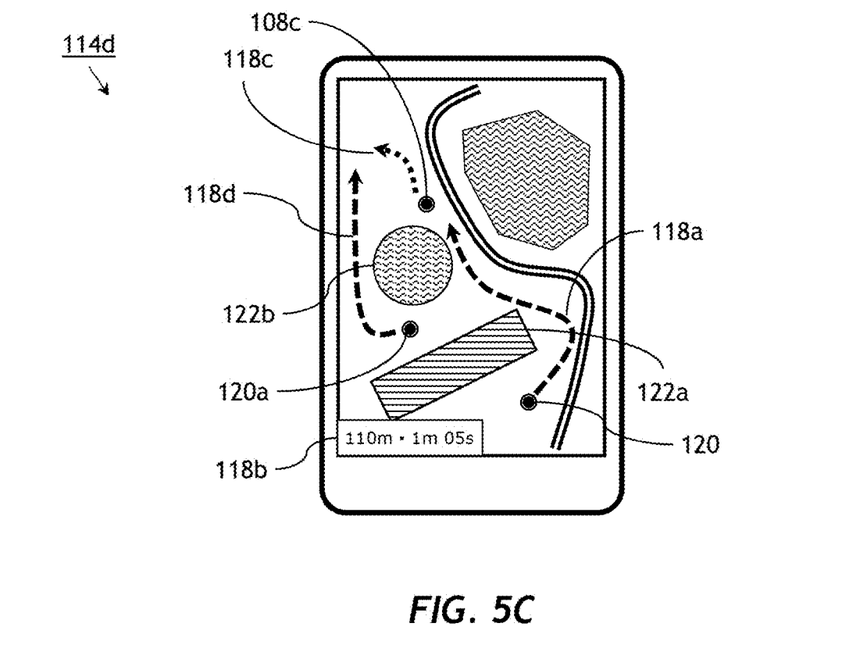

Referring back to FIG. 5A, an offboard system of the system 100 may include a second mobile device 114*d* carried by a second user 120*a* (e.g., an additional law enforcement professional or soldier). Referring also to FIG. 5C, the system 100 may infer a heading (118*c*) or future position of the target individual 108*c*. For example, assuming the user 120 follows the recommended route 118*a* to reach the target individual 108*c*, the target individual 108*c* may most likely follow the heading 118*c*. If the second user 120*a*, carrying the mobile device 114*d*, is in a position to intercept the target individual 108*c*, the system 100 may send captured images and the recommended route 118*a* (for the user 120) to the second mobile device 114d of the second user 120a, along with the projected heading 118c of the target individual 108c and a recommended intercept route 118d by which the second user 120a may most likely intercept the target individual 108c in the shortest amount of time or via the shortest distance. The mobile device 114c of the first user 120 may display the projected heading 118c of the target individual 108c as well as the position (and the recommended intercept route 118d) of the second user 120a, so that the two users 120, 120a may coordinate their pursuit of the target individual 108c.

Figure 6:
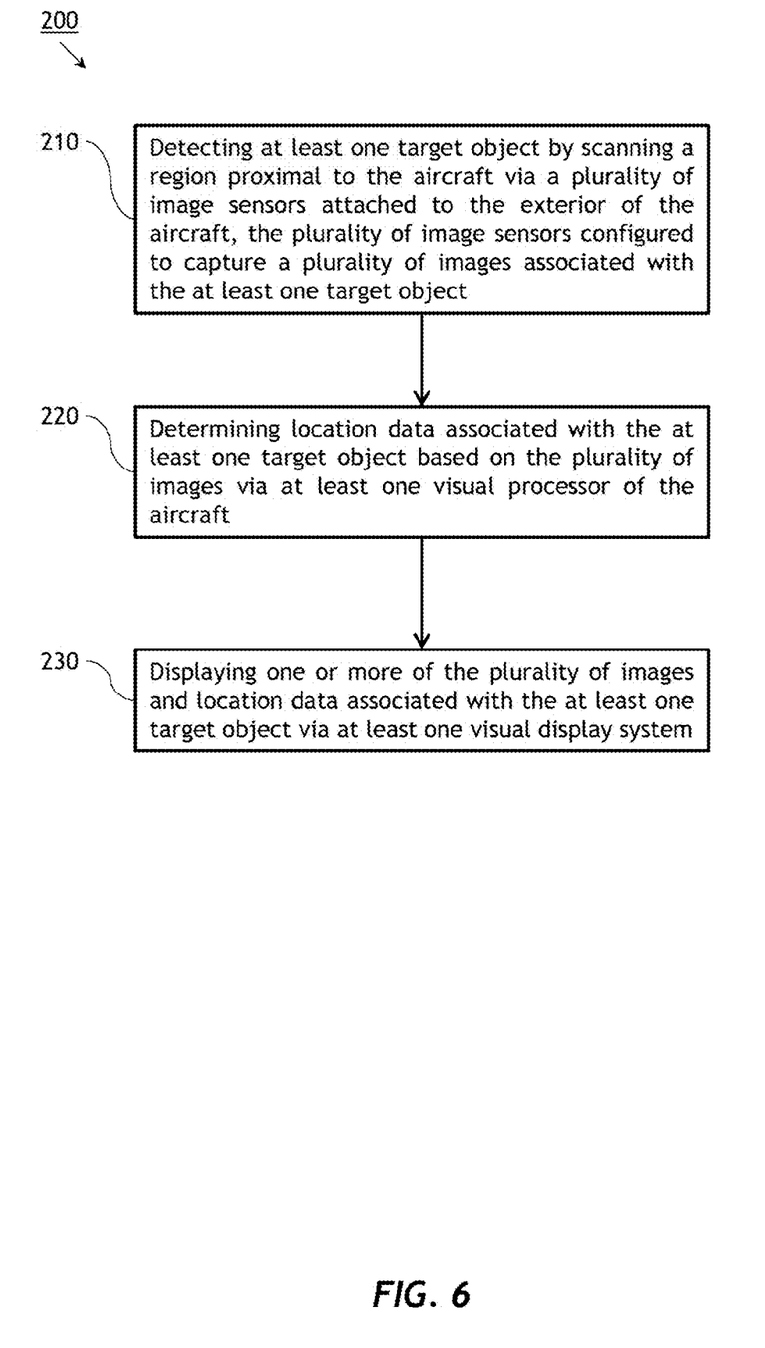
FIG. 6 is a process flow diagram illustrating a method according to embodiments of the inventive concepts disclosed herein.

Referring to FIG. 6, a process flow diagram illustrating a method 200 for detecting at least one target object 108 aboard an aircraft 102 is shown. At a step 210, the method 200 detects a target by scanning a region proximal to an aircraft via a network of image sensors attached to the exterior of the aircraft, the network of image sensors configured to capture a series of images associated with the target. For example, a visual display system may display the captured images to a pilot of the aircraft and select a target from the captured images based on input from the pilot. The image sensors may scan a region proximal to the aircraft with at least a first image sensor configured to capture a first image and a second image sensor configured to capture a second image.

At a step 220, the method 200 determines location data associated with the target based on the captured images via a visual processor of the aircraft. For example, the visual processors may determine a distance of the target, inertial coordinates of the target, georeferenced coordinates of the target, a velocity of the target, a heading of the target, and a future position of the target via the captured image.

At a step 230, the method 200 displays the captured images and determined location data associated with the target via a visual display system. For example, the visual display system may display the captured images and determined location data associated with the target via a heads-down display (HDD), a helmet-mounted display (HMD), or an offboard mobile device. The HMD may include a night-vision HMD and a head-tracking HMD. The visual display system may additionally display symbology associated with the captured images, the determined location data, or the target including a threat assessment, a map detail, an identifier of the target, and a route to a location of the target.

CONCLUSION

Specific blocks, sections, devices, functions, processes, and modules may have been set forth. However, a skilled technologist will realize that there are many ways to partition the system, and that there are many parts, components, processes, modules or functions that may be substituted for those listed above.

Those having skill in the art will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the broad scope of the inventive concepts described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

I claim:

1. An onboard system for detecting at least one mobile object, the system comprising:
   a plurality of image sensors couplable to an exterior surface of an aircraft, the plurality of image sensors configured to generate a plurality of images by scanning at least one spatial region proximal to the aircraft;
   at least one visual processor coupled to the plurality of image sensors and configured to:
      determine at least one dimension of the at least one spatial region;
      detect at least one mobile object within the at least one spatial region based on the plurality of images;
      generate targeting data associated with the at least one mobile object based on the plurality of images, the targeting data including at least a target assessment and location data associated with the at least one mobile object; and
      send one or more of the plurality of images and the targeting data to at least one visual display system;
   the at least one visual display system communicatively coupled to the at least one visual processor and configured to display the one of more of the plurality of images and the targeting data.

2. The system of claim 1, wherein the at least one visual processor is configured to detect the at least one mobile object based on input provided by a user via the at least one visual display system.

3. The system of claim 1, wherein the at least one visual processor is configured to determine, based on the plurality of images, one or more of a distance of the at least one mobile object, a target status of the at least one mobile object, an inertial coordinate of the at least one mobile object, and a georeferenced coordinate of the at least one mobile object.

4. The system of claim 1, wherein the at least one visual processor is configured to determine, based on the plurality of images, a velocity of the at least one mobile object, a heading of the at least one mobile object, and a future position of the at least one mobile object.

5. The system of claim 1, wherein the at least one spatial region includes at least one of a three-dimensional space proximal to the aircraft and at least one section of terrain proximal to the spatial region.

6. The system of claim 1, wherein the at least one mobile object includes at least one unmanned aircraft.

7. The system of claim 1, wherein the plurality of image sensors includes at least one of a visible light sensor, an infrared light sensor, and a stereo pair of image sensors.

8. The system of claim 1, wherein the plurality of image sensors includes at least a first image sensor couplable to a first location on the exterior surface of the aircraft, the first image sensor configured to generate a first plurality of images; and a second image sensor couplable to a second location on the exterior surface of the aircraft, the second image sensor configured to generate a second plurality of images.

9. The system of claim 1, wherein the at least one visual processor is incorporated into an image sensor of the plurality of image sensors.

10. The system of claim 1, wherein the at least one visual display system includes at least one of a heads-down display system of the aircraft, a helmet-mounted display system, a head-tracking display system, a multispectral fusion display system, and an offboard mobile device.

11. The system of claim 1, wherein the at least one visual display system is configured for at least one of picture-in-picture display, digital zoom, and the display of at least one symbol associated with one or more of the plurality of images, the location data, and the at least one mobile object.

12. The system of claim 11, wherein the at least one symbol includes at least one of a threat assessment, a map detail, an identifier of the at least one mobile object, and a route to a location.

13. A method for detecting at least one mobile object, comprising:
   detecting at least one mobile object by scanning a spatial region proximal to an aircraft via a plurality of image sensors attached to an exterior of the aircraft, the plurality of image sensors configured to capture a plurality of images associated with the at least one mobile object;
   generating targeting data associated with the at least one mobile object based on the plurality of images via at least one visual processor of the aircraft, the targeting data including at least a target assessment and location data associated with the at least one mobile object; and
   displaying one or more of the plurality of images and targeting data associated with the at least one mobile object via at least one visual display system associated with the aircraft.

14. The method of claim 13, wherein detecting at least one mobile object by scanning a spatial region proximal to an aircraft via a plurality of image sensors attached to an exterior of the aircraft, the plurality of image sensors configured to capture a plurality of images associated with the at least one mobile object includes:
   displaying the plurality of images to at least one user via the at least one visual display system; and
   selecting the at least one object from the plurality of images based on input from the at least one user.

15. The method of claim 13, wherein detecting at least one mobile object by scanning a spatial region proximal to an aircraft via a plurality of image sensors attached to an exterior of the aircraft, the plurality of image sensors configured to capture a plurality of images associated with the at least one mobile object includes:
   detecting the at least one mobile object by scanning a section of terrain proximal to the spatial region via the plurality of image sensors.

16. The method of claim 13, wherein generating targeting data associated with the at least one mobile object based on the plurality of images via at least one visual processor of the aircraft, the targeting data including at least a target assessment and location data associated with the at least one mobile object includes:
   determining, via the at least one visual processor, one or more of a distance of the at least one mobile object, a target status of the at least one mobile object, an inertial coordinate of the at least one mobile object, a georeferenced coordinate of the at least one mobile object, a velocity of the at least one mobile object, a heading of the at least one mobile object, and a future position of the at least one mobile object.

17. The method of claim 13, wherein displaying one or more of the plurality of images and targeting data associated with the at least one mobile object via at least one visual display system associated with the aircraft includes:
   displaying one or more of the plurality of images and targeting data associated with the at least one mobile object via one or more of a heads-down display system, a helmet-mounted display system, and an offboard mobile device.

18. The method of claim 17, wherein displaying one or more of the plurality of images and targeting data associated with the at least one mobile object via one or more of a heads-down display system, a helmet-mounted display system, and an offboard mobile device includes:
   displaying one or more of the plurality of images and targeting data associated with the at least one mobile object via a head-tracking helmet-mounted display system.

19. The method of claim 13, wherein displaying one or more of the plurality of images and targeting data associated with the at least one mobile object via at least one visual display system associated with the aircraft includes:
   displaying at least one symbol associated with one or more of the plurality of images, the targeting data, and the at least one mobile object via at least one visual display system associated with the aircraft, the at least one symbol including at least one of a threat assessment, a map detail, an identifier of the at least one target object, and a route to a location.

* * * * *